United States Patent [19]

Deitz et al.

[11] Patent Number: 5,486,600
[45] Date of Patent: Jan. 23, 1996

[54] FIBER-REACTIVE HALOTRIAZINYL OR HALOPYRIMIDINYL DISAZO DYES

[75] Inventors: Rolf Deitz, Basel; Athanassios Tzikas, Pratteln, both of Switzerland

[73] Assignee: Ciba-Geigy Corporation, Tarrytown, N.Y.

[21] Appl. No.: 94,646

[22] Filed: Jul. 19, 1993

[30] Foreign Application Priority Data

Jul. 23, 1992 [CH] Switzerland .............................. 2318/92

[51] Int. Cl.$^6$ ..................... C09B 62/513; C09B 62/09; D06P 1/38
[52] U.S. Cl. ..................... 534/634; 534/635; 534/636; 534/637
[58] Field of Search ..................... 534/635, 634, 534/636, 637

[56] References Cited

U.S. PATENT DOCUMENTS

| | | | |
|---|---|---|---|
| 3,340,247 | 9/1967 | Riat et al. | 534/637 |
| 4,338,092 | 7/1982 | Schneider | 534/637 X |
| 4,663,440 | 5/1987 | Omura et al. | 534/637 |
| 4,754,023 | 6/1988 | Tzikas | 534/618 |
| 4,786,721 | 11/1988 | Tzikas | 534/617 |
| 5,093,484 | 3/1992 | Herd | 534/637 X |
| 5,243,033 | 9/1993 | Tzikas | 534/637 X |
| 5,298,607 | 3/1994 | Seiler | 534/635 X |

FOREIGN PATENT DOCUMENTS 0018590 11/1980 European Pat. Off. .
0495753 7/1992 European Pat. Off. .

OTHER PUBLICATIONS

Gumprecht et al., Chemical Abstracts, 58: 12710h (1963).
Shirasaki, Chemical Abstracts, 84:6473n (1976).
Chem. Abstr. 94: 85,667m (1981).
Chem. Abstr. 110:59,521p (1989).

*Primary Examiner*—Robert W. Ramsuer
*Assistant Examiner*—Fiona T. Powers
*Attorney, Agent, or Firm*—Kevin T. Mansfield

[57] ABSTRACT

Reactive dyes of the formula

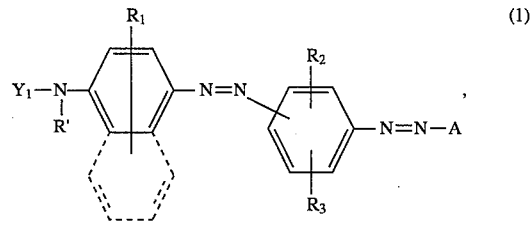

in which $R_1$, $R_2$, $R_3$, R', A and $Y_1$ are as defined in claim 1, are particularly suitable for dyeing or printing cellulosic fibre materials or naturally occurring or synthetic polyamide fibre materials with a high tinctorial yield, and produce dyeings and prints having good fastness properties.

17 Claims, No Drawings

FIBER-REACTIVE HALOTRIAZINYL OR HALOPYRIMIDINYL DISAZO DYES

The present invention relates to novel reactive dyes, processes for their preparation and their use for dyeing or printing fibre materials.

The practice of dyeing with reactive dyes has recently led to increased requirements on the quality of the dyeings and the profitability of the dyeing process. Consequently, there continues to be a need for novel reactive dyes which have improved properties, in particular in respect of application.

Reactive dyes which have an adequate substantivity and at the same time a good ease of washing-off of the non-fixed portions are now required for dyeing. They should furthermore have a good tinctorial yield and high reactivity, and in particular dyeings having high degrees of fixing should be produced. These requirements are not met by the known dyes in all the properties.

The present invention is therefore based on the object of discovering novel improved reactive dyes which can be used for dyeing and printing fibre materials and possess to a high degree the qualities characterised above. The novel dyes in particular should be distinguished by high fixing yields and high fibre-dye bond stabilities, and furthermore it should be easy to wash off the portions which have not been fixed to the fibre. They should moreover produce dyeings having good all-round properties, for example fastnesses to light and to wet conditions.

It has been found that the object described is largely achieved by the novel reactive dyes defined below.

The invention therefore relates to reactive dyes of the formula

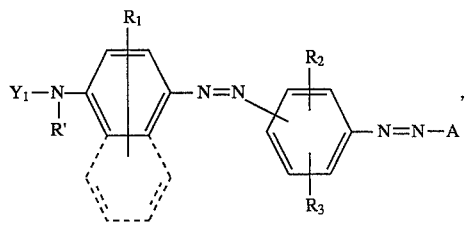

(1)

in which A is a radical of the benzene series, the naphthalene series or of the heterocyclic series, $R_1$ and $R_3$ independently of one another are hydrogen, $C_1$–$C_4$alkyl, $C_1$–$C_4$alkoxy, $C_2$–$C_4$alkanoylamino, halogen or sulfo, $R_2$ is $C_1$–$C_4$alkyl, $C_1$–$C_4$alkoxy, $C_2$–$C_4$alkanoylamino, halogen or sulfo, R' is hydrogen or $C_1$–$C_4$ alkyl which is unsubstituted or substituted by carboxyl, cyano, hydroxyl, sulfo or sulfato and $Y_1$ is a halotriazine or halopyrimidine reactive radical which is unsubstituted or further substituted.

$C_1$–$C_4$Alkyl $R_1$, $R_2$ and $R_3$ independently of one another are methyl, ethyl, propyl, isopropyl, butyl, isobutyl, sec-butyl or tert-butyl, in particular methyl.

$C_1$–$C_4$Alkoxy $R_1$, $R_2$ and $R_3$ independently of one another are methoxy, ethoxy, propoxy, isopropoxy, butoxy, isobutoxy, sec-butoxy or tert-butoxy, in particular methoxy.

$C_2$–$C_4$Alkanoylamino $R_1$, $R_2$ and $R_3$ independently of one another are, for example, acetylamino or propionylamino, in particular acetylamino.

Halogen $R_1$, $R_2$ and $R_3$ are, independently of one another, for example, fluorine, bromine or, in particular, chlorine.

The radical $R_1$ is preferably hydrogen.

The radical $R_3$ is preferably hydrogen.

The radical $R_2$ is preferably sulfo. The radical $R_2$, in particular the sulfo radical $R_2$, is preferably bonded in the ortho-position relative to the azo bridge which joins the radical A to the phenylene central component.

R' is preferably hydrogen or a $C_1$–$C_4$alkyl radical, and particularly preferably hydrogen, methyl or ethyl. R' is particularly preferably hydrogen.

Reactive radicals $Y_1$ are, in particular, those of the formulae

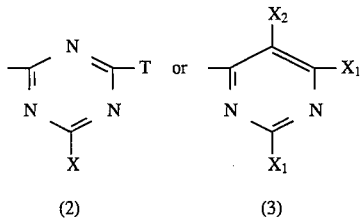

(2)                    (3)

in which X is a group which can be removed as an anion and T is a group which can be removed as an anion, or is a non-reactive radical or a fibre-reactive radical of the formula

  (4a)

  (4b)

  (4c)

  (4d)

—N-arylene-(alk)$_p$-W-alk'-SO$_2$—Z  or  (4e)
  |
  $R_6$

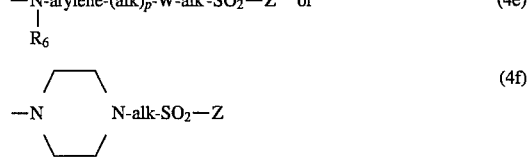  (4f)

in which W is a group of the formula —SO$_2$—NR$_4$—, —CONR$_4$— or —NR$_4$CO—, $R_4$ is hydrogen, $C_1$–$C_4$alkyl which is unsubstituted or substituted by hydroxyl, sulfo, sulfato, carboxyl or cyano, or a radical of the formula

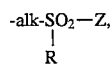

$R_6$ is hydrogen or $C_1$–$C_4$alkyl which is unsubstituted or substituted by hydroxyl, sulfo, sulfato, carboxyl or cyano, R is hydrogen, hydroxy, sulfo, sulfato, carboxyl, cyano, halogen, $C_1$–$C_4$alkoxycarbonyl, $C_1$–$C_4$alkanoyloxy, carbamoyl or the group —SO$_2$—Z, Z is a group of the formula —CH=CH$_2$ or —CH$_2$—CH$_2$—U$_1$ and U$_1$ is a leaving group, $Z_1$ is a group of the formula

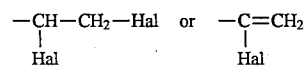

and

Hal is halogen, E is the radical —O— or —NR$_5$— and $R_5$ is hydrogen or $C_1$–$C_4$alkyl, alk and alk' independently of one another are $C_1$–$C_6$alkylene, arylene is a phenylene or naphthylene radical which is unsubstituted or substituted by sulfo, carboxyl, $C_1$–$C_4$alkyl, $C_1$–$C_4$alkoxy, $C_2$–$C_4$alkanyolamino or halogen and p is 0 or 1, one of the radicals $X_1$ is a group which can be removed as an anion and the other radical $X_1$ is a non-reactive substituent or a radical of the formulae (4a) to (4f) or a group which can be removed as an anion and $X_2$ is a negative substituent.

Suitable leaving groups $U_1$ are, for example, —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$—C$_1$-c$_4$ alkyl, —OSO$_2$—N(C$_1$-C$_4$alkyl)$_2$ or —OCO—C$_6$H$_5$.

$U_1$ is preferably a group of the formula —Cl, —OSO$_3$H, —SSO$_3$H,—OCO—CH$_3$, —OCO—C$_6$H$_5$ or —OPO$_3$H$_2$, in particular —Cl or —OSO$_3$H, preferably —OSO$_3$H.

alk and alk' independently of one another are, for example, a methylene, ethylene, 1,3-propylene, 1,4-butylene, 1,5-pentylene or 1,6-hexylene radical or branched isomers thereof.

alk and alk' are preferably a $C_1$–$C_4$alkylene radical, and particularly preferably an ethylene radical.

Arylene is preferably a 1,3- or 1,4-phenylene radical which is unsubstituted or substituted, for example, by sulfo, methyl, methoxy or carboxyl.

R is preferably hydrogen.

$R_4$ is preferably hydrogen or $C_1$–$C_4$alkyl, such as methyl, ethyl, propyl, isopropyl, butyl, isobutyl, sec-butyl or tert-butyl. $R_4$ is particularly preferably hydrogen.

$R_6$ is preferably hydrogen, methyl or ethyl, in particular hydrogen.

E is preferably —NH— or —O—, and particularly preferably —O—.

W is preferably a group of tile formula —CONH— or —NHCO—, in particular a group of the formula —CONH—.

Hal in the radical $Z_1$ is preferably chlorine or, in particular, bromine.

p is preferably the number 0.

Preferred reactive radicals are those in which W is a group of the formula —CONH— or —NHCO—, R, $R_4$, $R_5$ and $R_6$ are hydrogen, E is the radical —O— or —NH— and $U_1$ is a group of the formula —Cl, —OSO$_3$H, —SSO$_3$H, —OCO—CH$_3$, —OCO—C$_6$H$_5$ or —OPO$_3$H$_2$, in particular a group of the formula —Cl or —OSO$_3$H, and preferably —OSO$_3$H.

X is, for example, halogen, such as fluorine, chlorine or bromine, sulfo, $C_1$–$C_4$alkylsulfonyl or phenylsulfonyl, and preferably halogen, in particular fluorine or chlorine.

A group T which can be removed as an anion is, for example, halogen, such as fluorine, chlorine or bromine, sulfo, $C_1$–$C_4$alkylsulfonyl or phenylsulfonyl, and preferably halogen, in particular fluorine or chlorine.

A non-reactive radical T can be, for example, hydroxyl, $C_1$–$C_4$alkoxy, $C_1$–$C_4$alkylthio, morpholino or unsubstituted or substituted amino. Unsubstituted or substituted amino T is unsubstituted amino or, for example, N-$C_1$–$C_4$alkylamino or N,N-di-$C_1$–$C_4$alkylamino, in which the alkyl is unsubstituted or substituted, for example, by sulfo, sulfato, hydroxyl, carboxyl or phenyl, cyclohexylamino, N-$C_1$–$C_4$alkyl-N-phenylamino, phenylamino, naphthylamino or N-$C_1$–$C_4$alkyl-N-naphthylamino, in which the phenyl or naphthyl is unsubstituted or substituted, for example, by $C_1$–$C_4$alkyl, $C_1$–$C_4$alkoxy, $C_2$–$C_4$alkanoylamino, carboxyl, sulfo or halogen.

Examples of suitable non-reactive radicals T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, 1,5-disulfo-2-naph- thylamino, N-ethyl-N-phenylamino, N-methyl-N-phenylamino, methoxy, ethoxy, n- or iso-propoxy and hydroxy.

A non-reactive radical T is preferably $C_1$–$C_4$alkoxy, $C_1$–$C_4$alkylthio, hydroxyl, amino, N-$C_1$–$C_4$alkylamino which is unsubstituted in the alkyl part or substituted by hydroxyl, sulfato or sulfo, morpholino or phenylamino, N-$C_1$–$C_4$alkyl-N-phenylamino, naphthylamino or N-$C_1$–$C_4$-alkyl-N-naphthylamino which is unsubstituted in phenyl ring or naphthyl ring or substituted by sulfo, carboxyl, $C_2$–$C_4$alkanoylamino, $C_1$–$C_4$alkyl or $C_1$–$C_4$alkoxy.

Particularly preferred non-reactive radicals T are $C_1$–$C_4$alkoxy, morpholino or phenylamino, N-$C_1$–$C_4$alkyl-N-phenylamino, naphthylamino or N-$C_1$–$C_4$alkyl-N-naphthylamino which is unsubstituted in the phenyl ring or naphthyl ring or substituted by sulfo, carboxyl, $C_2$–$C_4$alkanoylamino, $C_1$–$C_4$alkyl or $C_1$–$C_4$alkoxy.

The radical T is preferably halogen, in particular fluorine or chlorine, or phenylamino, N-$C_1$–$C_4$alkyl-N-phenylamino, naphthylamino or N-$C_1$–$C_4$alkyl-N-naphthylamino which is unsubstituted in the phenyl ring or naphthyl ting or substituted by sulfo, carboxyl, $C_2$–$C_4$alkanoylamino, $C_1$–$C_4$alkyl or $C_1$–$C_4$alkoxy, or is a reactive radical of the formulae (4a) to (4f) which are as defined and as preferred above.

The radical $X_1$ which can be removed as an anion is preferably halogen, in particular fluorine or chlorine.

A non-reactive substituent $X_1$ is as defined and as preferred above, for example, for a non-reactive substituent T.

The radical $X_1$ is particularly preferably halogen, in particular fluorine or chlorine.

Examples of suitable radicals $X_2$ are nitro, cyano, $C_1$–$C_4$alkylsulfonyl, carboxyl, chlorine, hydroxyl, $C_1$–$C_4$alkoxysulfonyl, $C_1$–$C_4$alkylsulfinyl, $C_1$–$C_4$alkoxycarbonyl or $C_2$–$C_4$alkanoyl, and $X_2$ is preferably chlorine, cyano or methylsulfonyl. $X_2$ is particularly preferably halogen, in particular chlorine.

Preferred reactive radicals of the formula (2) are those in which X is halogen and T is as defined as preferred above.

Preferred reactive radicals of the formula (3) are those in which the two substituents $X_1$ are halogen, in particular chlorine or fluorine, and $X_2$ is halogen, in particular chlorine.

Particularly preferred reactive radicals of the formula (3) are those in which the two substituents $X_1$ are fluorine or chlorine and $X_2$ is chlorine.

$Y_1$ is preferably a reactive radical of the formula (2) or (3) in which X, $X_1$ and $X_2$ are halogen and T is halogen, phenylamino, N-$C_1$–$C_4$alkyl-N-phenylamino, naphthylamino or N-$C_1$–$C_4$alkyl-N-naphthylamino which is unsubstituted in the phenyl ring or naphthyl ring or substituted by sulfo, carboxyl, $C_2$–$C_4$alkanoylamino, $C_1$–$C_4$alkyl or $C_1$–$C_4$alkoxy, or, in particular, a fibre-reactive radical of the formulae (4a) to (4f), in which the reactive radicals of the formula (4a) to (4f) are as defined and as preferred above.

The radical A in the reactive dye of the formula (1) can have the substituents customary in organic dyes.

Examples of substituents in the radical A are: alkyl groups having 1 to 12 carbon atoms, in particular 1 to 4 carbon atoms, such as methyl, ethyl, propyl, isopropyl or butyl, alkoxy groups having 1 to 8 carbon atoms, in particular 1 to 4 carbon atoms, such as methoxy, ethoxy, propoxy, isopropoxy or butoxy, alkanoylamino groups having 2 to 8 carbon atoms, in particular 2 to 4 carbon atoms, such as acetylamino or propionylamino, phenyl- or naphthylamino, alkoxycarbonylamino groups having 2 to 8 carbon atoms, in particular 2 to 4 carbon atoms, alkanoyl groups having 2 to 8 carbon atoms, in particular 2 to 4 carbon atoms, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, alkoxycarbonyl having 1 to 4 carbon atoms in the alkoxy radical, such as methoxycarbonyl or ethoxycarbonyl, benzoyl, benzoylamino which is unsubstituted or substituted by $C_1$–$C_4$alkyl on the nitrogen, phenyl, naphthyl, amino, amino which is mono- or disubstituted by $C_1$–$C_{12}$alkyl, phenyl, naphthyl or cyano, trifluoromethyl, nitro, cyano, hydroxyl, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulhmoyl having 1 to 4 carbon atoms, such as N-methylsulfamoyl, N-ethylsulfamoyl, N-propylsulhmoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, carboxyl, sulfomethyl, sulfo or sulfato, and fibre-reactive radicals, in which the substituents containing an alkyl, phenyl or naphthyl radical can be further substituted in the alkyl, phenyl or naphthyl radical, for example by the substituents mentioned above for A. The alkyl radicals moreover can be interrupted by oxygen (—O—). Preferred substituents containing an alkyl radical are those which can be interrupted by oxygen in the alkyl radical (with the exception of methyl) and can be substituted, for example, by hydroxyl, sulfo, sulfato, cyano, $C_5$–$C_7$cycloalkyl which is unsubstituted or further substituted by $C_1$–$C_{14}$alkyl, or phenyl or naphthyl which is unsubstituted or substituted by $C_1$–$C_4$alkyl, $C_1$–$C_4$alkoxy, $C_2$–$C_4$ alkanoylamino, halogen or sulfo. Preferred substituents containing a phenyl or naphthyl radical are those which can be further substituted in the phenyl or naphthyl radical by $C_1$–$C_4$alkyl, $C_1$–$C_4$alkoxy, $C_2$–$C_4$alkanoylamino, halogen or sulfo.

Fibre-reactive radicals in the radical A are, for example, reactive radicals of the formulae (2) and (3) which, in particular, are bonded to the radical A via a bridge member of the formula —N(R')—, in which R' and the reactive radicals of the formulae (2) and (3) am as defined and as preferred above.

Particularly preferred fibre-reactive radicals in the radical A are those of the formulae (2) and (3) in which X, $X_1$ and $X_2$ are halogen, in particular fluorine or chlorine, and T is a group which can be removed as an anion or is a non-reactive radical.

Especially preferred fibre-reactive radicals in the radical A are those of the formulae (2) and (3) in which X, $X_1$ and $X_2$ are halogen, in particular fluorine or chlorine, and T is halogen, hydroxyl, sulfo, $C_1$–$C_4$alkoxy, $C_1$–$C_4$alkylthio, $C_1$–$C_4$alkylsulfonyl, phenylsulfonyl, morpholino or amino which is unsubstituted or substituted. The radical T is, in particular, halogen, $C_1$–$C_4$alkoxy, $C_1$–$C_4$alkylthio, hydroxyl, amino, N-$C_1$–$C_4$alkylamino which is unsubstituted in the alkyl part or substituted by hydroxyl, sulhto or sulfo, morpholino, or phenylamino, N—$C_1$–$C_4$alkyl-N-phenylamino, naphthylamino or N-$C_1$–$C_4$alkyl-N-naphthylamino which is unsubstituted in the phenyl ring or naphthyl ring or substituted by sulfo, carboxyl, $C_2$–$C_4$alkanoylamino, $C_1$–$C_4$alkyl or $C_1$–$C_4$alkoxy. The radical T is especially preferably phenylamino, N—$C_1$–$C_4$alkyl-N-phenylamino, naphthylamino or N—$C_1$–$C_4$alkyl-N-naphthylamino which is unsubstituted in the phenyl ring or naphthyl ring or substituted by sulfo, carboxyl, $C_2$–$C_4$alkanoylamino, $C_1$–$C_4$alkyl or $C_1$–$C_4$alkoxy, the substituent being, in particular, sulfo.

The radical A is preferably an unsubstituted or substituted benzene, naphthalene, 6-hydroxypyrid-2-one, pyrazole or pyrimidine radical, in which, in particular, the substituents are as defined and as preferred above.

Preferred substituents of the radical A are $C_1$–$C_4$alkyl, $C_1$–$C_4$alkoxy, $C_2$–$C_6$alkanoylamino, $C_2$–$C_8$alkoxycarbonylamino, or phenyl, phenylamino or benzoylamino which is unsubstituted or substituted by $C_1$–$C_4$alkyl, $C_1$–$C_4$alkoxy, $C_2$–$C_4$alkanoylamino, halogen or sulfo, cyano, hydroxyl, carbamoyl, carboxyl, sulfomethyl, ureido, halogen, sulfo, sulfato, amino or amino which is substituted by cyano or $C_1$–$C_{12}$alkyl, in which the $C_1$–$C_{12}$alkyl radical is unsubstituted or substituted by phenyl, naphthyl, $C_5$–$C_7$cycloalkyl, hydroxyl, sulfo or sulhto, the phenyl and naphthyl radical can be further substituted by $C_1$–$C_4$alkyl, $C_1$–$C_4$alkoxy, $C_2$–$C_4$alkanoylamino, halogen or sulfo and the $C_5$–$C_7$cycloalkyl radical can be further substituted by $C_1$–$C_4$alkyl, and the $C_1$–$C_{12}$alkyl radical, with the exception of methyl, can be interrupted by oxygen. Further preferred substituents of the radical A are reactive radicals as defined and as preferred above.

The radical A is especially preferably a radical of the formula

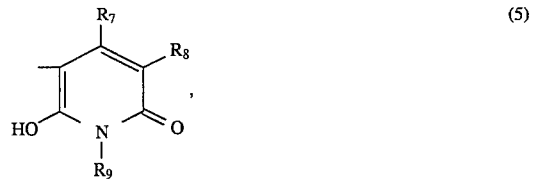

(5)

in which $R_7$ and $R_9$ independently of one another are hydrogen, $C_1$–$C_4$alkyl, or phenyl which is unsubstituted or substituted by $C_1$–$C_4$alkyl, $C_1$–$C_4$alkoxy, C2-C4alkanoylamino, halogen or sulfo and $R_8$ is hydrogen, cyano, carbamoyl or sulfomethyl, or a radical of the formula

(6)

in which $R_{10}$ and $R_{11}$ independently of one another are hydroxyl, amino or amino which is substituted by $C_1$–$C_{12}$alkyl, in which the $C_1$–$C_{12}$alkyl radical is unsubstituted or further substituted by hydroxyl, sulfo or sulfato and, with the exception of methyl, can be interrupted by oxygen, and $R_{12}$ is hydrogen, $C_1$–$C_4$alkyl, hydroxyl, amino which is unsubstituted or substituted by cyano or phenyl which is unsubstituted or substituted by $C_1$–$C_4$alkyl, $C_1$–$C_4$alkoxy, $C_2$–$C_4$alkanoylamino, halogen or sulfo, or a radical of the formula

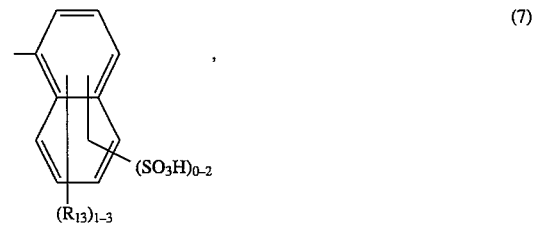

(7)

in which $(R_{13})_{1-3}$ is 1 to 3 identical or different substituents from the group comprising hydrogen, $C_1$–$C_4$alkyl, $C_1$–$C_4$alkoxy, $C_2$–$C_4$alkanoylamino, halogen, hydroxyl, amino or N-mono- or N,N-di-$C_1$–$C_4$alkylamino, or a radical of the formula

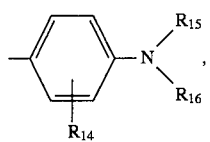

in which $R_{14}$ is hydrogen, $C_1$–$C_4$alkyl, $C_{1-4}$alkoxy, $C_2$–$C_6$alkanoylamino, $C_2$–$C_8$alkoxycarbonylamino, ureido, halogen or sulfo and $R_{15}$ and $R_{16}$ independently of one another are hydrogen, a halopyrimidine or halotriazine reactive radical which is unsubstituted or further substituted or $C_1$–$C_8$alkyl which is unsubstituted or substituted by hydroxyl, sulfo, sulfato, phenyl or $C_5$–$C_7$cycloalkyl, in which the phenyl radical can be further substituted by $C_1$–$C_4$alkyl, $C_1$–$C_4$alkoxy, $C_2$–$C_4$alkanoylamino, halogen or sulfo and the $C_5$–$C_7$cycloalkyl radical can be further substituted by $C_1$–$C_4$alkyl, or a radical of the formula

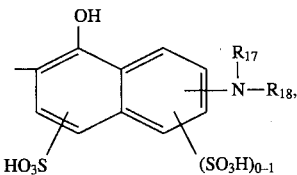

in which $R_{17}$ is hydrogen or $C_1$–$C_4$alkyl and $R_{18}$ is $C_2$–$C_6$alkanoyl, benzoyl which is unsubstituted or substituted by $C_1$–$C_4$alkyl, $C_1$–$C_4$alkoxy, $C_2$–$C_4$alkanoylamino, halogen or sulfo or a halopyrimidine or halotriazine reactive radical which is unsubstituted or further substituted, or a radical of the formula

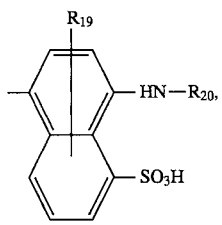

in which $R_{19}$ is hydrogen, $C_1$–$C_4$alkyl, $C_1$–$C_4$alkoxy, $C_2$–$C_4$alkanoylamino, halogen or sulfo and $R_{20}$ is phenyl which is unsubstituted or substituted by $C_1$–$C_4$alkyl, $C_1$–$C_4$alkoxy, $C_2$–$C_4$alkanoylamino, halogen or sulfo or a halopyrimidine or halotriazine reactive radical which is unsubstituted or further substituted, or a radical of the formula

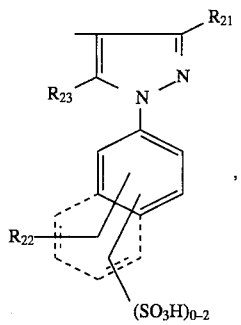

in which $R_{21}$ is $C_1$–$C_4$alkyl or carboxyl, $R_{22}$ is hydrogen, $C_1$–$C_4$alkyl, $C_1$–$C_4$alkoxy, $C_2$–$C_4$alkanoylamino or halogen and $R_{23}$ is hydroxyl or amino.

Particularly preferred radicals A are those of the formulae (5) to (9) and (11).

Preferred radicals of the formula (5) are those in which $R_7$ and $R_9$ are $C_1$–$C_4$alkyl. $R_8$ is preferably cyano, carbamoyl or sulfomethyl.

Preferred radicals of the formula (6) are those in which $R_{10}$ and $R_{11}$ independently of one another are hydroxyl, amino or amino which is substituted by $C_1$–$C_8$alkyl, in particular $C_1$–$C_4$alkyl, in which the alkyl radical is unsubstituted or further substituted by hydroxyl, sulfo or sulfato and, with the exception of methyl, can be interrupted by oxygen. $R_{12}$ is preferably hydroxyl, phenyl or amino which is unsubstituted or substituted by cyano.

Preferred radicals of the formula (7) are those in which $R_{13}$ is hydrogen, hydroxyl, amino or N-$C_1$–$C_4$alkylamino. The radical of the formula (7) preferably contains only one sulfo group.

Preferred radicals of the formula (8) are those in which $R_{15}$ and $R_{16}$ independently of one another are hydrogen, a halotriazine or halopyrimidine reactive radical which is unsubstituted or further substituted or $C_1$–$C_8$alkyl which is unsubstituted or substituted by hydroxyl, sulfo, sulfato or phenyl, in which the phenyl radical can be further substituted by $C_1$–$C_4$alkyl, $C_1$–$C_4$alkoxy, $C_2$–$C_4$alkanoylamino, halogen or sulfo, in particular by sulfo. The radical $R_{14}$ is preferably hydrogen, $C_2$–$C_6$alkanoylamino, halogen, ureido or sulfo, in particular hydrogen, $C_2$–$C_6$alkanoylamino or ureido.

$R_{17}$ in the radical of the formula (9) is preferably hydrogen.

The aromatic radical bonded in the 1-position in the radical of the formula (11) is preferably a phenyl radical. $R_{21}$ is preferably $C_1$–$C_4$alkyl, in particular methyl, $R_{22}$ is preferably hydrogen or sulfo, in particular sulfo, and $R_{23}$ is preferably amino.

Of the radicals of the formulae (5) to (10), preferably only the radicals of the formulae (8) and (9) contain a halopyrimidine or halotriazine reactive radical which is unsubstituted or further substituted.

halopyrimidine or halotriazine reactive radicals which are unsubstituted or further substituted in the radicals of the fomulae (8) to (10) are preferably the reactive radicals A as defined and as preferred above.

Especially preferred reactive dyes of the formula (1) are those in which A is a radical of the formula (5) to (9) or (11), R' is hydrogen or $C_1$–$C_4$alkyl and $Y_1$ is a radical of the formulae (2) or (3), in which X, $X_1$ and $X_2$ are halogen and T is halogen or phenylamino, N-$C_1$–$C_4$alkyl-N-phenylamino, naphthylamino or N-$C_1$–$C_4$alkyl-N-naphthylamino which is unsubstituted in the phenyl ring or naphthyl ring or substituted by sulfo, carboxyl, $C_2$–$C_4$alkanoylamino, $C_1$–$C_4$alkyl or $C_1$–$C_4$alkoxy, or, in particular, a fibre-reactive radical of the formulae (4a) to (4f). Especially important reactive dyes are those of the formula

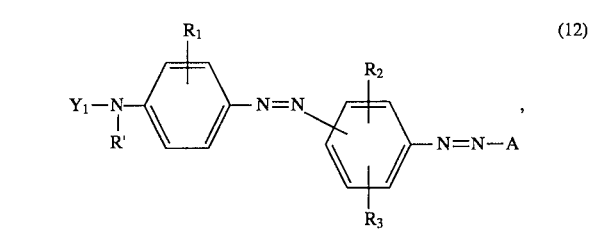

in which $R_1$, $R_2$, $R_3$, R', A and $Y_1$ are as defined and as preferred above.

Reactive dyes which are of particular interest are those of the formula

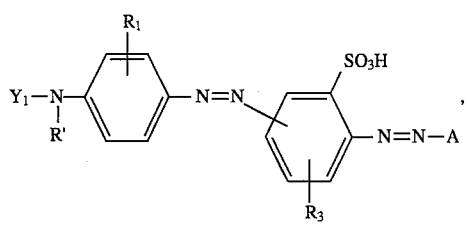

(13)

in which $R_1$, $R_3$, R', A and $Y_1$ are as defined and as preferred above.

Reactive dyes which are of special interest are those of the formula

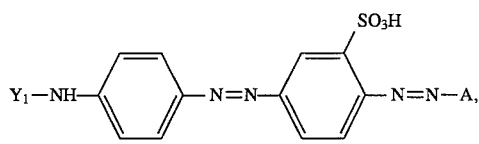

(14)

in which $Y_1$ and A are as defined and as preferred above.

The invention furthermore relates to a process for the preparation of the reactive dyes of the formula (1) which comprises diazotising an amine of the formula

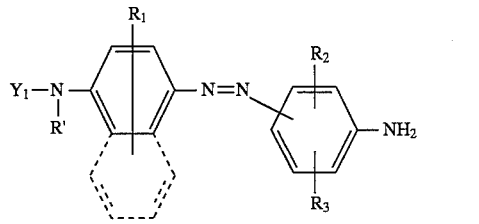

(15)

and coupling the diazotisation product to a compound of the formula

H—A (16)

and if appropriate subsequently carrying out a further conversion reaction, in which R', $R_1$, $R_2$, $R_3$, $Y_1$ and A are as defined under formula (1).

The diazotisation of the amine of the formula (15) is as a rule carried out by the action of nitrous acid in aqueous-mineral acid solution at a low temperature, for example 0° to 10° C., and the coupling to the coupling component of the formula (16) is carried out at an acid or neutral to weakly alkaline pH, in particular at a pH of 2 to 8.

A modified embodiment of the process comprises first preparing a dye which contains a precursor of the reactive radical and subsequently converting this into the final stage, for example by esterification or an addition reaction. For example, a dye in which Z is a radical HO—$CH_2CH_2$— can be prepared and this product can be reacted with sulfuric acid such that the hydroxyl group is converted into the sulfato group. The sulfation of the hydroxyl group is carried out, for example, by reaction with concentrated sulfuric acid at about 0° C. to moderately elevated temperature.

The synthesis furthermore can be followed by elimination reactions. For example, reactive dyes of the formula (1) which contain sulfatoethylsulfonyl radicals can be treated with eliminating agents, for example sodium hydroxide, the sulfatoethylsulfonyl radicals being convened into vinylsulfonyl radicals.

In principle, the reactive dyes of the formula (1) can be prepared by starting from precursors or intermediates for dyes which contain fibre-reactive radicals, or by introducing these fibre-reactive radicals into intermediates having a dye character which are suitable for this purpose.

In the process according to the invention for the preparation of the reactive dyes of the formula (1), the substituents of the compounds of the formulae (15) and (16) are as defined and as preferred above.

The compounds of the formulae (15) and (16) are known or can be prepared by processes analogous to known processes.

Thus, for example, the amines of the formula (15) can be obtained by subjecting a compound of the formula

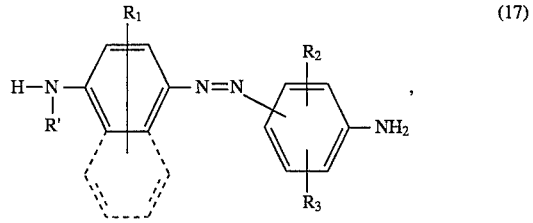

(17)

in which $R_1$, $R_2$, $R_3$ and R' are as defined above, to a condensation reaction with fibre-reactive radicals of the halotriazine or halopyrimidine series, in particular a compound of the formula

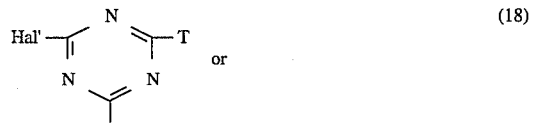

(18)

or

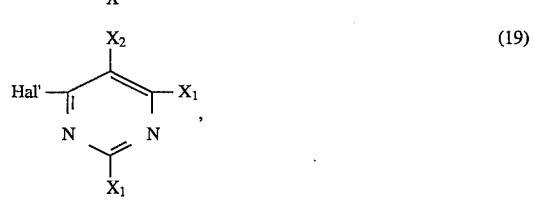

(19)

in which X, $X_1$, $X_2$ and T are as defined above and Hal' is halogen, in particular fluorine or chlorine.

The condensation is as a rule carded out in aqueous solution at a temperature of, for example, 0° to 50° C. and at a pH of, for example, 4 to 9.

The reactive dyes of the fomula (1) which contain a sulfo or sulfato group are present either in the form of their free acid or preferably as salts thereof. Examples of suitable salts are the alkali metal salts, alkaline earth metal salts or ammonium salts or the salts of an organic amine. Examples are the sodium salts, lithium salts, potassium salts or anamonium salts or the salt of mono-, di- or triethanolamine.

The reactive dyes of the fomula (1) are suitable for dyeing and printing the most diverse materials, such as fibre materials containing hydroxyl groups or nitrogen. Examples are silk, leather, wool, polyamide fibres and polyurethanes, and in particular all types of cellulosic fibre materials. Such cellulosic fibre materials are, for example, the naturally occurring cellulose fibres, such as cotton, linseed and hemp, and cellulose and regenerated cellulose. The reactive dyes of the formula (1) are also suitable for dyeing or printing fibres containing hydroxyl groups which are contained in blend fabrics, for example blends of cotton with polyester fibres or polyamide fibres. The reactive dyes of the formula (1) are particularly suitable for dyeing or printing cellulosic fibre materials or, in particular, naturally occurring or synthetic polyamide fibre materials.

The dyes according to the invention can be applied to the fibre material and fixed on the fibre in various ways, in particular in the form of aqueous dye solutions and printing pastes. They are suitable both for the exhaust process and for dyeing by the pad-dyeing process, in which the goods are impregnated with aqueous dye solutions, which contain salts if appropriate, and the dyes are fixed, after treatment with an alkali or in the presence of alkali, if appropriate under the action of heat. They are particularly suitable for the so-called cold pad-batch process, in which the dye is applied on the padder, together with the alkali, and then fixed by storage at room temperature for several hours. After the fixing, the dyeings or prints are rinsed thoroughly with cold and hot water, if appropriate with addition of a dispersing agent which promotes diffusion of the non-fixed portions.

The reactive dyes of the formula (1) are distinguished by a high reactivity, good fixing capacity and very good build-up capacity. They can therefore be employed by the exhaust dyeing process at low dyeing temperatures and require only short steaming times in the pad-steam process. The degrees of fixing are high and the non-fixed portions can easily be washed off, the difference between the degree of exhaustion

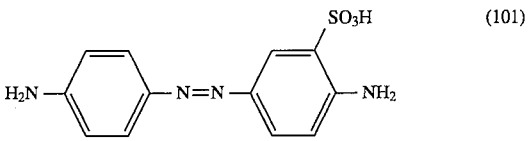

is added to the resulting condensation product. The reaction mixture is then brought to a pH of 5 by means of an aqueous sodium hydroxide solution and a condensation reaction is carded out at this pH and at a temperature of 10° to 25° C. The product is precipitated by addition of potassium chloride and then filtered off. After drying, 40 parts of a compound of the formula

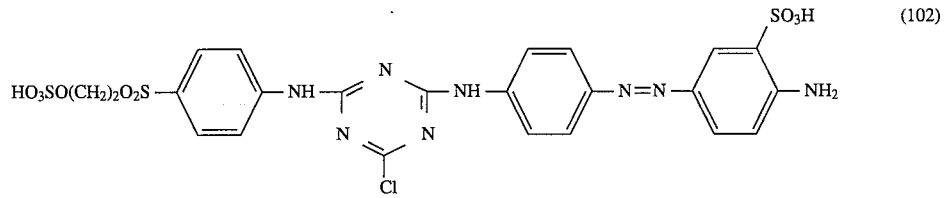

are obtained.

and degree of fixing being remarkably small, i.e. the soaping loss being very low. The reactive dyes of the formula (1) are also particularly suitable for printing, in particular on cotton, but also for printing nitrogen-containing fibres, for example wool or silk or blend fabrics containing wool or silk.

The dyeings and prints produced with the dyes according to the invention have a high colour strength and a high fibre-dye bond stability both in the acid and in the alkaline range, and furthermore a good fastness to light and very The compound of the formula (102) thus obtained is then introduced into 500 parts of water and diazotised in the customary manner (by acidification with hydrochloric acid and addition of an aqueous sodium nitrite solution).

28 parts of β-naphthol-6-sulfonic acid are now added and coupling is carried out at a pH of 7 and at a temperature of 0° to 20° C. The resulting dye is then subjected to reverse osmosis and freeze-dried. A dye which, in the form of the free acid, is the compound of the formula

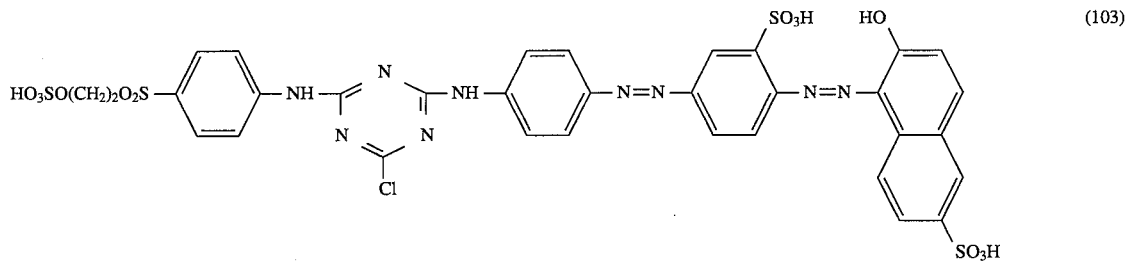

good wet-fastness properties, such as fastnesses to washing, water, sea-water, crossdyeing and perspiration, as well as a good fastness to pleating, fastness to ironing and fastness to rubbing.

The examples which follow serve to illustrate the invention. The temperatures are stated in degrees Celsius, and parts and percentages are by weight, unless stated otherwise. Parts by weight bear the same relation to parts by volume as the kilogram to the liter.

EXAMPLE 1

7.8 parts of cyanuric chloride are stirred in 150 parts of an ice-water suspension. 11.8 pans of 4-β-sulfatoethylsulfonylaniline are added and the mixture is left to undergo a condensation reaction at a pH of 2.5 to 3.5 and at a temperature of 0° to 5° C. for a period of 2 to 3 hours. A solution of 300 pans of water and 15.82 parts of an amine of the formula is obtained. The dye of the formula (103) dyes cotton and wool in red colour shades.

EXAMPLES 2 to 64

The reactive dyes shown in column 2 in the following table, which dye wool and cotton in the colour shades shown in column 3, can be obtained analogously to Example 1.

TABLE

| Example | Reactive dye | Colour shade |
|---|---|---|
| 2 | Structure: 4-[[4-chloro-6-[[4-(2-sulfatoethylsulfonyl)phenyl]amino]-1,3,5-triazin-2-yl]amino]phenyl azo – (2-sulfophenyl) azo – 1-ethyl-3-carbamoyl-4-methyl-6-hydroxy-pyridin-2-one | Orange |
| 3 | Analogous triazine–phenyl–azo–(2-sulfophenyl)–azo–2-hydroxynaphthalene | Red |
| 4 | Analogous triazine–phenyl–azo–(2-sulfophenyl)–azo– barbituric acid derivative | Yellow |
| 5 | Analogous triazine–phenyl–azo–(2-sulfophenyl)–azo–1-ethyl-3-(sulfomethyl)-4-methyl-6-hydroxy-pyridin-2-one | Orange |
| 6 | Analogous triazine–phenyl–azo–(2-sulfophenyl)–azo–8-benzoylamino-1-hydroxy-3,6-disulfonaphthalene | Claret |

TABLE-continued
| Example | Reactive dye | Colour shade |
|---|---|---|
| 7 | 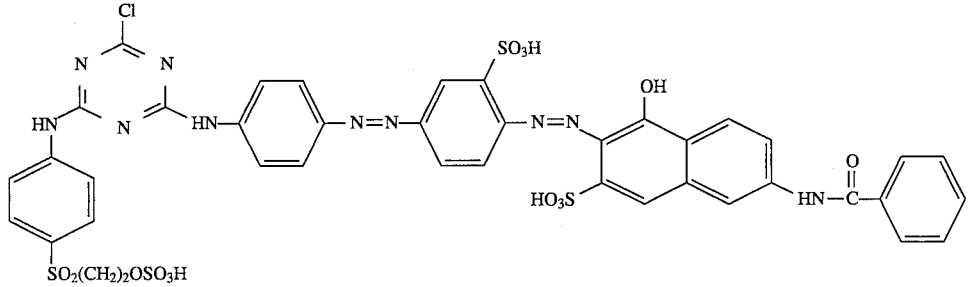 | Red |
| 8 | 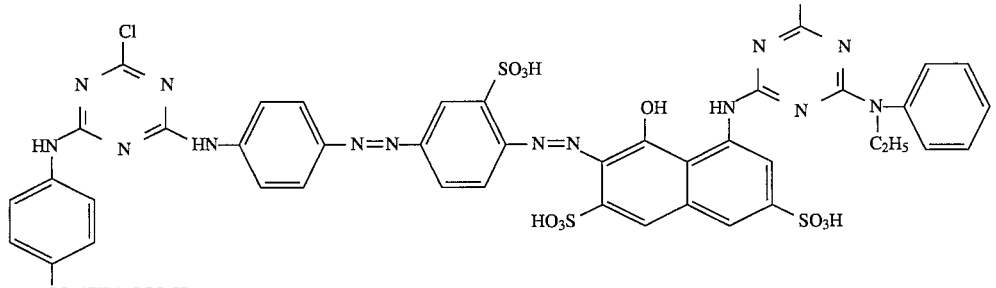 | Claret |
| 9 | 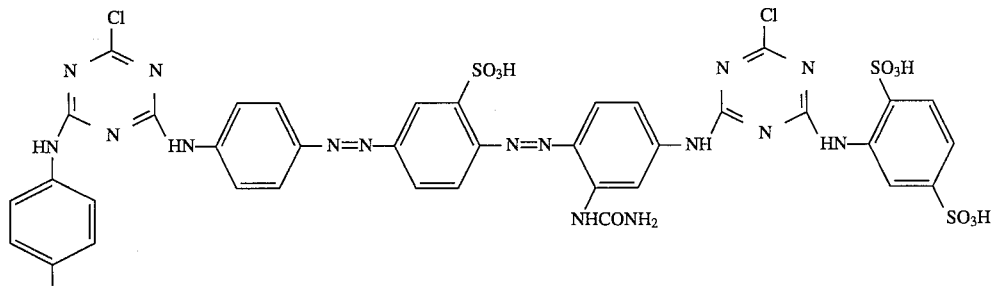 | Orange |
| 10 | 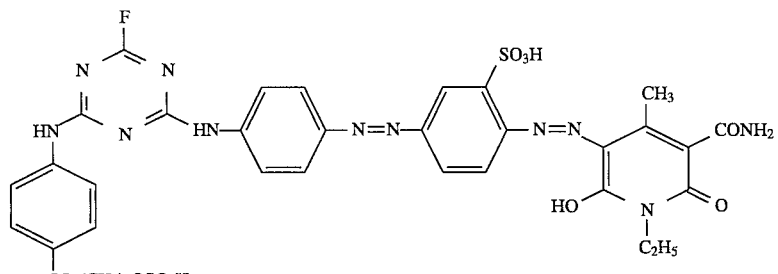 | Orange |
| 11 | 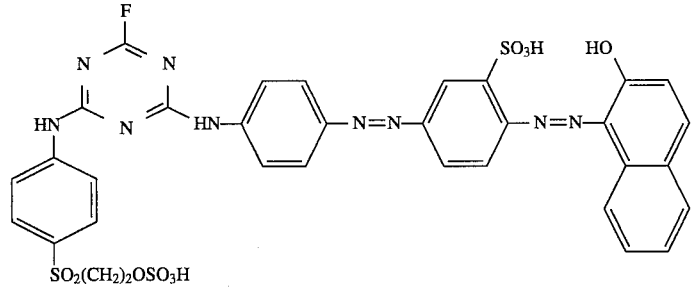 | Red |

TABLE-continued

| Example | Reactive dye | Colour shade |
|---|---|---|
| 12 | (structure) | Yellow |
| 13 | (structure) | Orange |
| 14 | (structure) | Claret |
| 15 | (structure) | Red |
| 16 | (structure) | Claret |

TABLE-continued

| Example | Reactive dye | Colour shade |
|---|---|---|
| 17 | (structure with fluorotriazine linked via NH-phenyl-N=N-phenyl(SO₃H)-N=N-phenyl(NHCONH₂)-NH-chlorotriazine-NH-phenyl(SO₃H, SO₃H); pendant phenyl-SO₂(CH₂)₂OSO₃H) | Orange |
| 18 | (fluorotriazine-NH-phenyl-NH, with HN-phenyl-SO₂(CH₂)₂OSO₃H; coupled -NH-phenyl-N=N-phenyl(SO₃H)-N=N-(2-hydroxy-6-sulfo-naphthyl)) | Red |
| 19 | (chlorotriazine-NH-phenyl(CONH(CH₂)₂SO₂(CH₂)₂OSO₃H), HN-phenyl-N=N-phenyl(SO₃H)-N=N- pyridone (CH₃, CONH₂, OH, N-C₂H₅, =O)) | Orange |
| 20 | (chlorotriazine-NH-phenyl-SO₂(CH₂)₂OSO₃H, HN-phenyl-N=N-phenyl(SO₃H)-N=N-(2-hydroxynaphthyl)) | Red |
| 21 | (chlorotriazine-NH-phenyl(CONH(CH₂)₂SO₂(CH₂)₂OSO₃H), HN-phenyl-N=N-phenyl(SO₃H)-N=N-bis(hydroxy)pyrimidine type coupler) | Yellow |

TABLE-continued
| Example | Reactive dye | Colour shade |
|---|---|---|
| 22 | 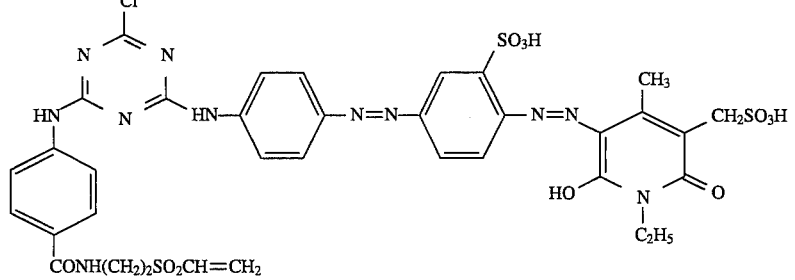 | Orange |
| 23 | 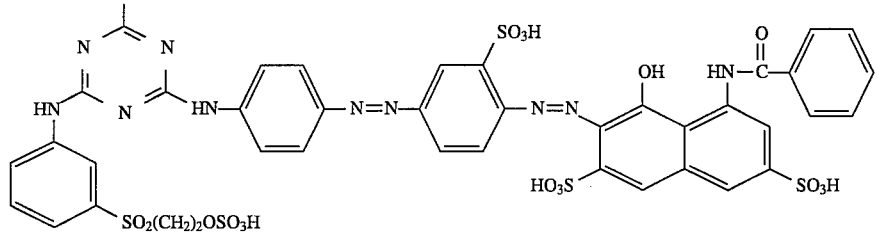 | Claret |
| 24 | 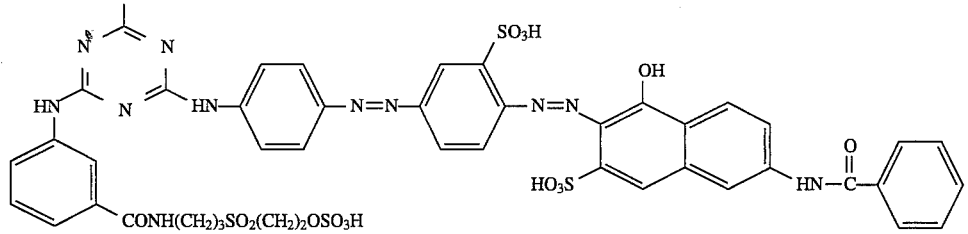 | Red |
| 25 | 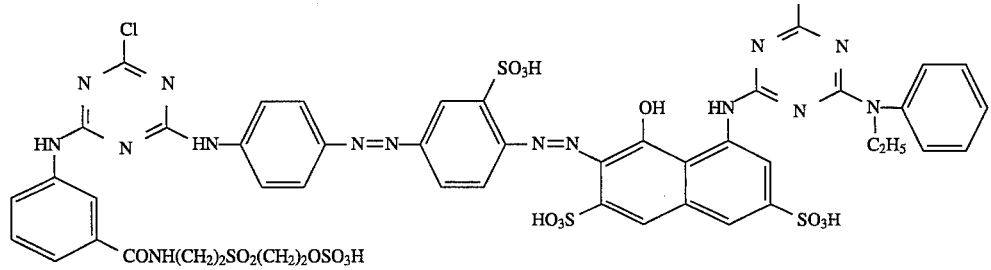 | Claret |
| 26 | 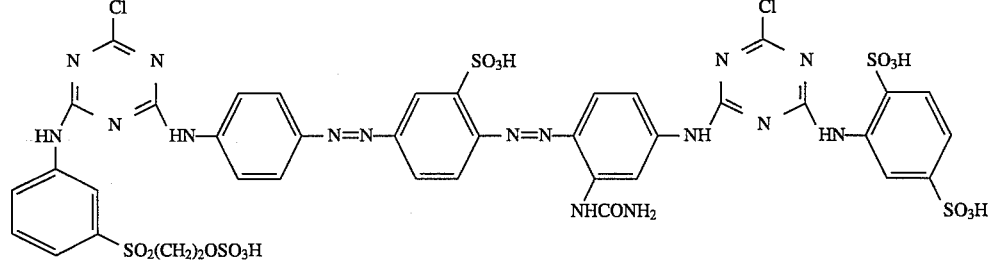 | Orange |

TABLE-continued

| Example | Reactive dye | Colour shade |
|---|---|---|
| 27 | | Red |
| 28 | | Orange |
| 29 | | Red |
| 30 | | Yellow |
| 31 | | Orange |

TABLE-continued

| Example | Reactive dye | Colour shade |
|---|---|---|
| 32 | (structure) | Claret |
| 33 | (structure) | Red |
| 34 | (structure) | Claret |
| 35 | (structure) | Orange |
| 36 | (structure) | Red |

| Example | Reactive dye | Colour shade |
|---|---|---|
| 37 | 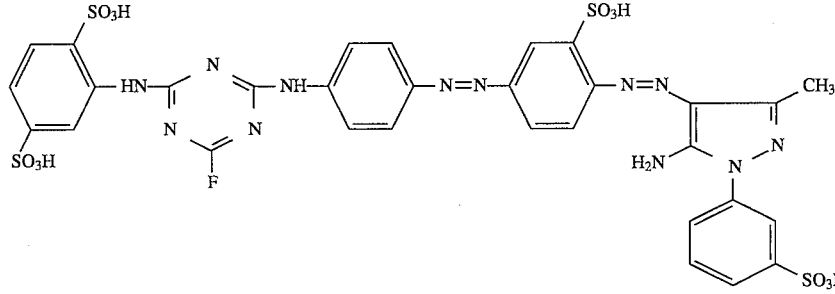 | Orange |
| 38 | 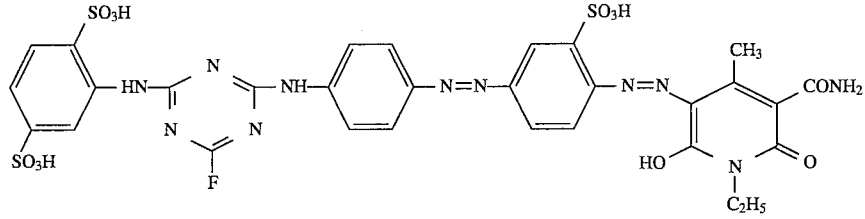 | Orange |
| 39 | 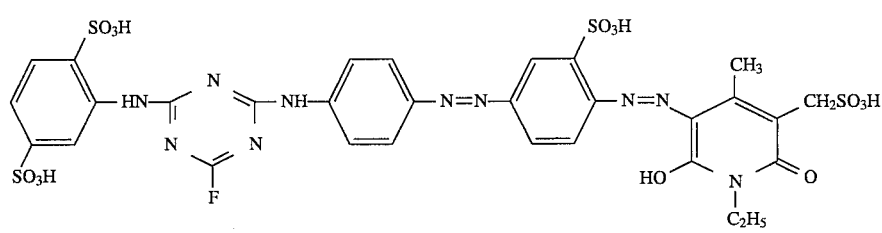 | Orange |
| 40 | 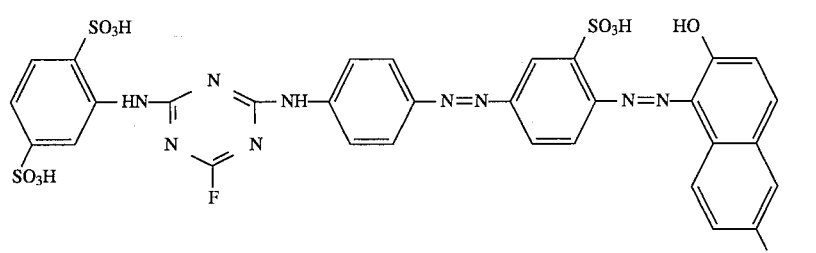 | Red |
| 41 | 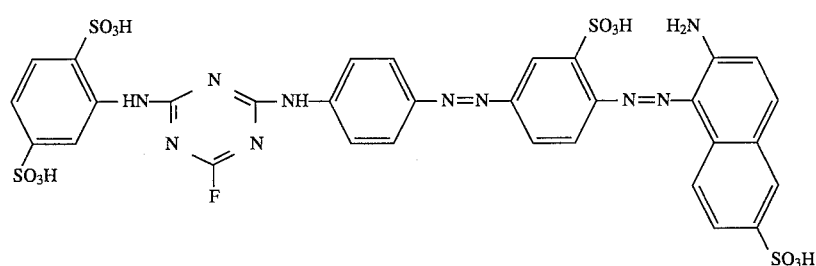 | Claret |
| 42 | 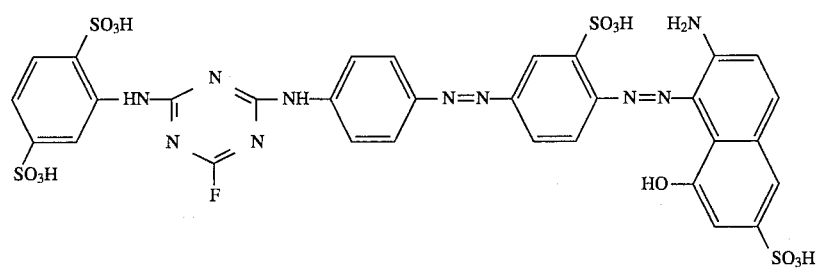 | Violet |

TABLE-continued
| Example | Reactive dye | Colour shade |
|---|---|---|
| 43 | 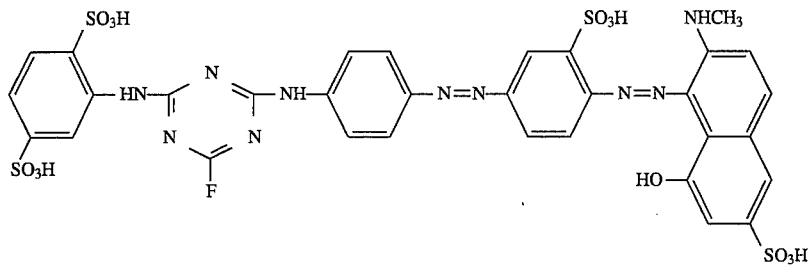 | Navy blue |
| 44 | 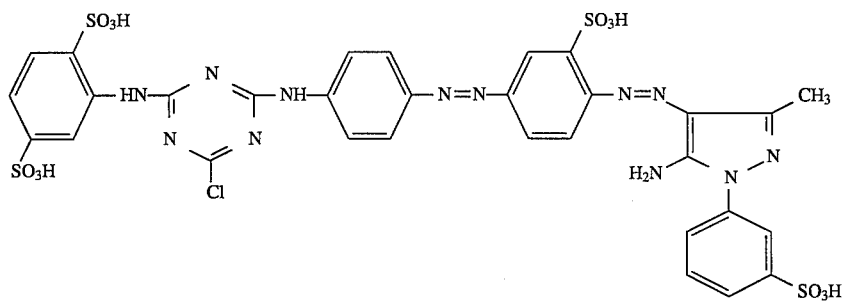 | Orange |
| 45 | 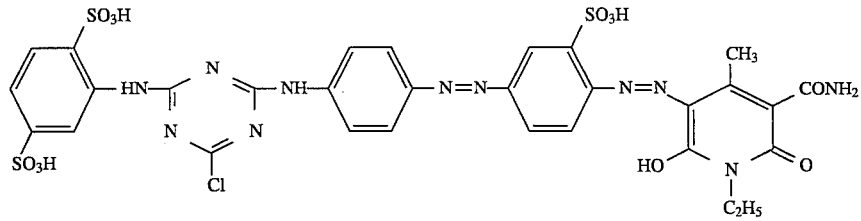 | Orange |
| 46 | 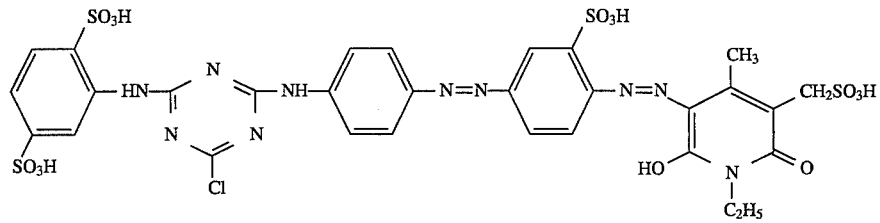 | Orange |
| 47 | 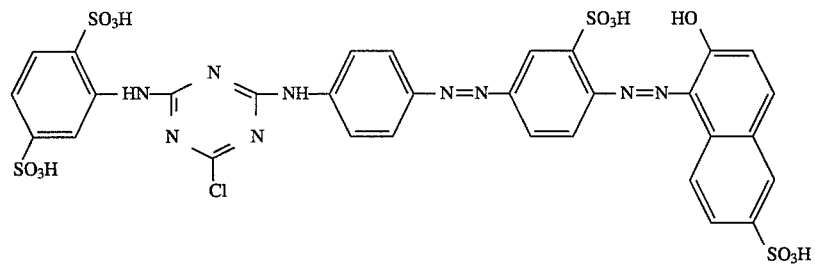 | Red |
| 48 | 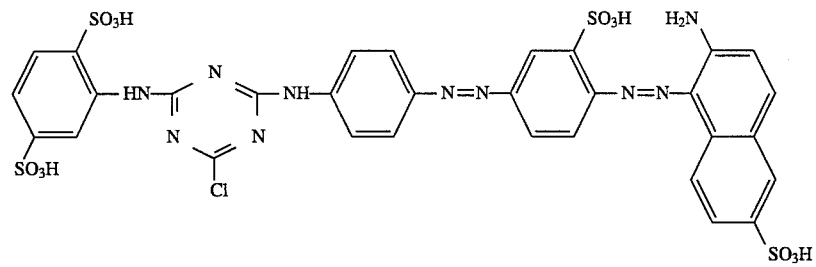 | Claret |

TABLE-continued

| Example | Reactive dye | Colour shade |
|---|---|---|
| 49 | | Violet |
| 50 | | Navy blue |
| 51 | | Orange |
| 52 | | Orange |
| 53 | | Orange |
| 54 | | Red |

TABLE-continued

| Example | Reactive dye | Colour shade |
|---|---|---|
| 55 | | Claret |
| 56 | | Violet |
| 57 | | Navy blue |
| 58 | | Orange |
| 59 | | Orange |
| 60 | | Orange |

| Example | Reactive dye | Colour shade |
|---|---|---|
| 61 | | Red |
| 62 | | Claret |
| 63 | | Violet |
| 64 | | Navy blue |

Dyeing Instructions 2 parts of the reactive dye obtained according to Example 1 are dissolved in 400 parts of water; 1500 pans of a solution containing 53 g of sodium chloride per liter are added. 100 parts of cotton fabric are introduced into this dyebath at 40° C. After 45 minutes, 100 pans of a solution containing 16 g of sodium hydroxide and 20 g of calcined sodium carbonate per liter are added. The temperature of the dyebath is kept at 40° C. for a further 45 minutes. The dyed goods are then rinsed, soaped at the boil with a nonionic detergent for a quarter of an hour, rinsed again and dried.

Printing Instructions 3 parts of the reactive dye obtained according to Example 1 are sprinkled into 100 parts of a stock thickener mixture comprising 50 parts of 5% sodium alginate thickener, 27.8 pans of water, 20 parts of urea, 1 part of sodium m-nitrobenzenesulfonate and 1.2 parts of sodium bicarbonate, while stirring rapidly. A cotton fabric is printed with the printing paste thus obtained and is dried, and the resulting printed material is steamed in saturated steam at 102° C. for 2 minutes. The printed fabric is then rinsed, soaped at the boil, if appropriate, and rinsed again, and then dried.

What is claimed is:

1. A reactive dye of the formula

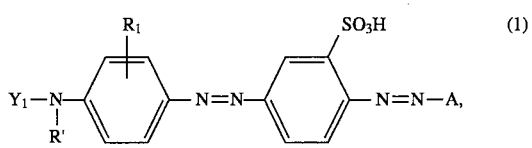

in which R' and $R_1$ are each hydrogen, $Y_1$ is a halotriazine reactive radical of the formula

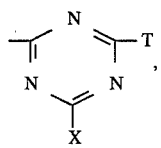 (2)

in which X is chlorine or fluorine and T is a fibre-reactive radical of the formula $$-\underset{R_4}{\underset{|}{N}}-alk-SO_2-Z,\qquad(4a)$$

$$-\underset{R_6}{\underset{|}{N}}-alk-E-alk'-SO_2-Z,\qquad(4b)$$

$$-\underset{R_6}{\underset{|}{N}}-arylene-SO_2-Z,\qquad(4c)$$

$$-\underset{R_6}{\underset{|}{N}}-arylene-NH-CO-Z_1,\qquad(4d)$$

$$-\underset{R_6}{\underset{|}{N}}-arylene-(alk)_p-W-alk'-SO_2-Z\ \ or\qquad(4e)$$

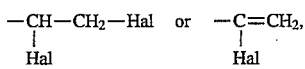 (4f)

in which W is a group of the formula —CONH—, R is hydrogen, $R_4$ is hydrogen or $C_1$–$C_4$alkyl, $R_6$ is hydrogen, methyl or ethyl, Z is a group of the formula —CH=$CH_2$ or —$CH_2$—$CH_2$—$U_1$, $U_1$ is a group of the formula —Cl or —$OSO_3H$, $Z_1$ is a group of the formula $$-\underset{Hal}{\underset{|}{CH}}-CH_2-Hal\ \ or\ \ -\underset{Hal}{\underset{|}{C}}=CH_2,$$

Hal is bromine, E is the radical —O— or —NH—, alk and alk' independently of one another are $C_1$–$C_4$alkylene, arylene is a 1,3- or 1,4-phenylene radical which is unsubstituted or substituted by sulfo, carboxyl, methyl or methoxy or is naphthylene and p is 0, and A is a radical of the formula

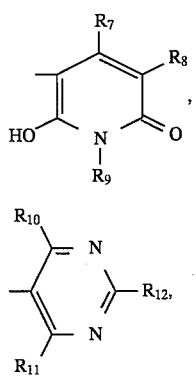

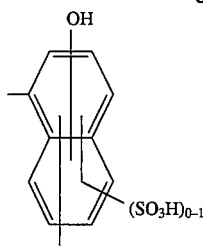 (7)

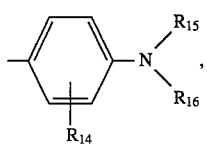 (8)

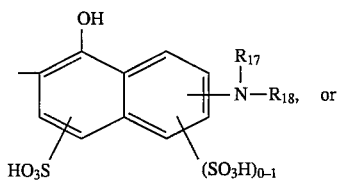 (9)

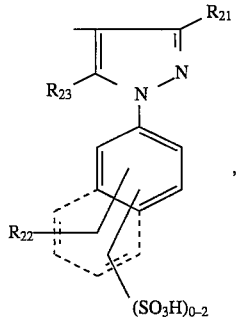 (11)

wherein $R_7$ and $R_9$ independently of one another are $C_1$–$C_4$alkyl, $R_8$ is cyano, carbamoyl or sulfomethyl, $R_{10}$ and $R_{11}$ independently of one another are hydroxyl, amino or amino which is substituted by $C_1$–$C_4$alkyl, in which the alkyl radical is unsubstituted or further substituted by hydroxyl, sulfo or sulfato and, with the exception of methyl, can be interrupted by oxygen, $R_{12}$ is hydroxyl, phenyl or amino which is unsubstituted or substituted by cyano, $R_{13}$ is hydrogen, amino or N—$C_1$–$C_4$alkylamino, $R_{14}$ is hydrogen, $C_2$–$C_6$alkanoylamino or ureido, $R_5$ and $R_{16}$ independently of one another are hydrogen, a halotriazine reactive radical of the formula (2) or $C_1$–$C_8$alkyl which is unsubstituted or substituted by hydroxyl, sulfo, sulfato or phenyl, in which the phenyl radical is unsubstituted or substituted by sulfo, $R_{17}$ is hydrogen, $R_{18}$ is $C_2$–$C_6$alkanoyl, benzoyl which is unsubstituted or substituted by $C_1$–$C_4$alkyl, $C_1$–$C_4$alkoxy, $C_2$–$C_4$alkanoylamino, halogen or sulfo or is a halotriazine reactive radical of the formula (2), $R_{21}$ is $C_1$–$C_4$alkyl, $R_{22}$ hydrogen and $R_{23}$ is amino.

2. A reactive dye according to claim 1, in which A is a radical of the formula (5).

3. A reactive dye according to claim 1, in which A is a radical of the formula (6).

4. A reactive dye according to claim 1, in which A is a radical of the formula (7).

5. A reactive dye according to claim 4, in which A is the radical of 2-naphthol or 2-hydroxynaphthalene-6-sulfonic acid.

6. A reactive dye according to claim 1, in which A is a radical of the formula (8).

7. A reactive dye according to claim 1, in which A is a radical of the formula (9).

8. A reactive dye according to claim 1, in which A is a radical of the formula (11).

9. A reactive dye according to claim 1, in which T is a fibre-reactive radical of the formula —NH—alk—SO$_2$—Z, —NH—alk—O—alk'—SO$_2$—Z,

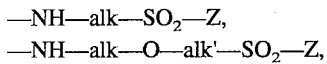, or

in which Z is a group of the formula —CH=CH$_2$ or —CH$_2$—CH$_2$—U$_1$, U$_1$ is a group of the formula —Cl or —OSO$_3$H, alk and alk' independently of one another are C$_1$–C$_4$alkylene, and A is a radical of the formula (5), (6) or (7).

10. A reactive dye of the formula

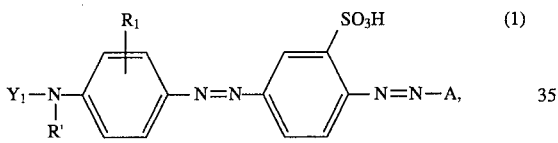 (1)

in which R' and R$_1$ are each hydrogen, Y$_1$ is a halotriazine reactive radical of the formula

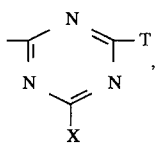 (2)

in which X is chlorine or fluorine and T is phenylamino, N—C$_1$–C$_4$alkyl-N-phenylamino, naphthylamino or N—C$_1$–C$_4$alkyl-N-naphthylamino which is unsubstituted in the phenyl ring or naphthyl ring or substituted by sulfo, carboxyl, C$_2$–C$_4$alkanoylamino, C$_1$–C$_4$alkyl or C$_1$–C$_4$alkoxy, and A is a radical of the formula

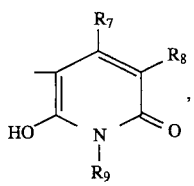 (5)

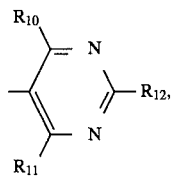 (6)

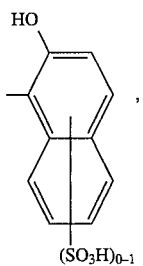 (7a)

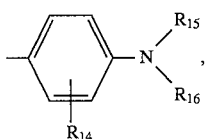 (8)

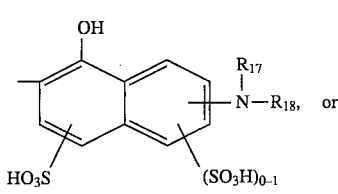 (9)

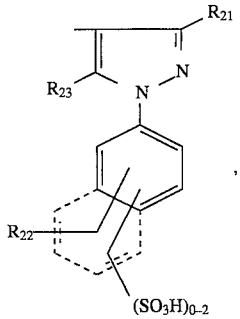 (11)

wherein R$_7$ and R$_9$ independently of one another are C$_1$–C$_4$alkyl, R$_8$ is cyano, carbamoyl or sulfomethyl, R$_{10}$ and R$_{11}$ independently of one another are hydroxyl, amino or amino which is substituted by C$_1$–C$_4$alkyl, in which the alkyl radical is unsubstituted or further substituted by hydroxyl, sulfo or sulfato and, with the exception of methyl, can be interrupted by oxygen. R$_{12}$ is hydroxyl, phenyl or amino which is unsubstituted or substituted by cyano, R$_{14}$ is hydrogen, C$_2$–C$_6$alkanoylamino or ureido, R$_{15}$ and R$_{16}$ independently of one another are hydrogen, a halotriazine reactive radical of the formula (2) or C$_1$–C$_8$alkyl which is unsubstituted or substituted by hydroxyl, sulfo, sulfato or phenyl, in which the phenyl radical is unsubstituted or substituted by sulfo, R$_{17}$ is hydrogen, R$_{18}$ is C$_2$–C$_6$alkanoyl, benzoyl which is unsubstituted or substituted by C$_1$–C$_4$alkyl, C$_1$–C$_4$alkoxy, C$_2$–C$_4$alkanoylamino, halogen or sulfo or is a halotriazine reactive radical of the formula (2), R$_{21}$ is C$_1$–C$_4$alkyl, R$_{22}$ hydrogen and R$_{23}$ is amino.

11. A reactive dye according to claim 10, in which A is a radical of the formula (5).

12. A reactive dye according to claim 10, in which A is a radical of the formula (6).

13. A reactive dye according to claim 10, in which A is a radical of the formula (7a).

14. A reactive dye according to claim 10, in which A is the radical of 2-naphthol or 2-hydroxynaphthalene-6-sulfonic acid.

15. A reactive dye according to claim 10, in which A is a radical of the formula (8).

16. A reactive dye according to claim 10, in which A is a radical of the formula (9).

17. A reactive dye according to claim 10, in which A is a radical of the formula (11).

* * * * *